Dec. 8, 1959 A. J. W. M. VAN OVERBEEK ET AL 2,916,662
MEMORY TUBE
Filed March 18, 1953 4 Sheets-Sheet 1
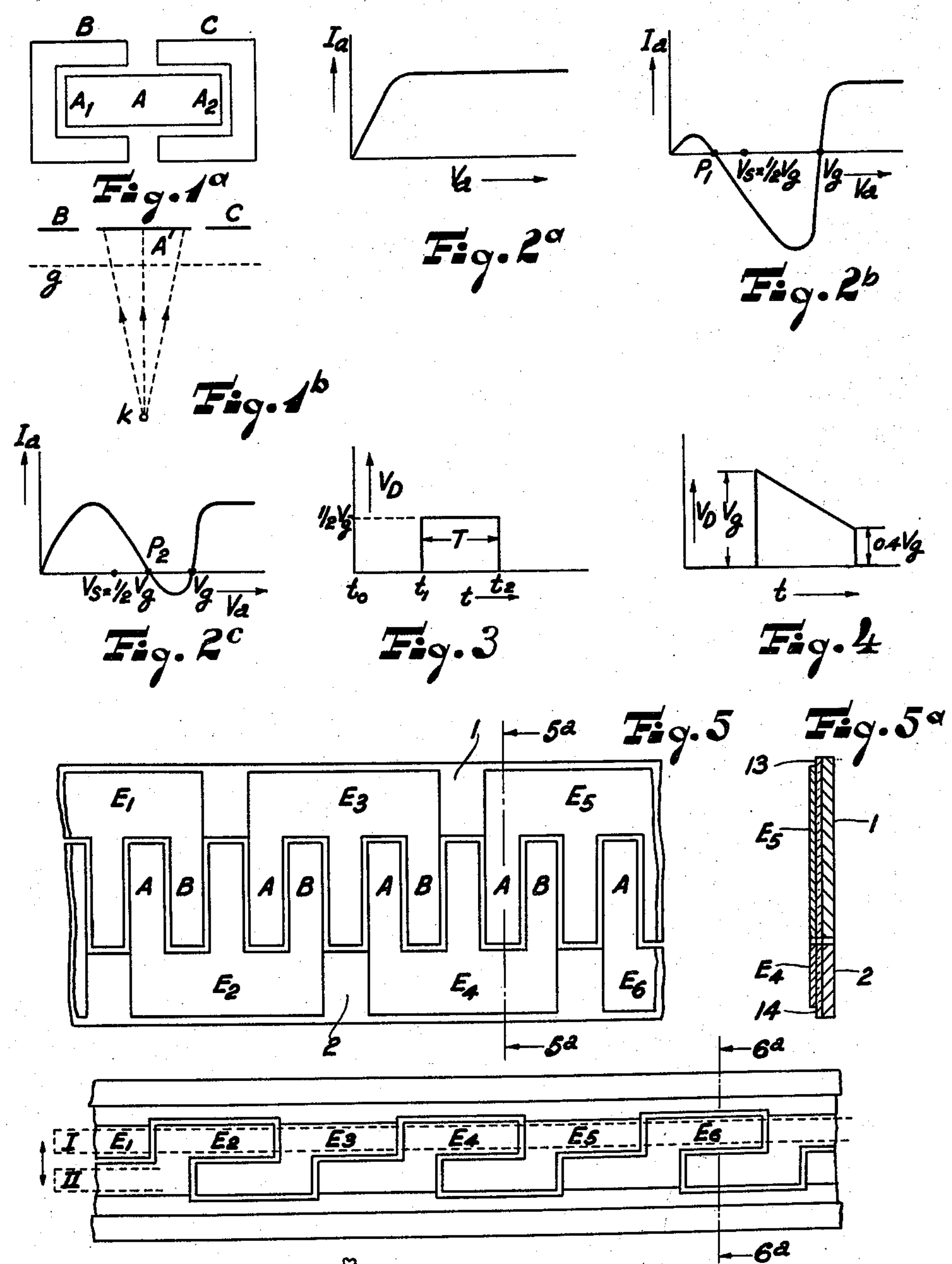
Fig. 1a, Fig. 1b, Fig. 2a, Fig. 2b, Fig. 2c, Fig. 3, Fig. 4, Fig. 5, Fig. 5a
Fig. 6
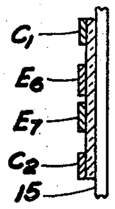
Fig. 6a
INVENTORS.
ADRIANUS JOHANNES WILHELMUS MARIE VAN OVERBEEK
HENDRIK GROENDIJK
BY
[signature]
AGENT.

Dec. 8, 1959 A. J. W. M. VAN OVERBEEK ET AL 2,916,662

MEMORY TUBE

Filed March 18, 1953 4 Sheets-Sheet 2

INVENTOR.
ADRIANUS J. W. M. VAN OVERBEEK
BY
AGENT

Dec. 8, 1959 A. J. W. M. VAN OVERBEEK ET AL 2,916,662

MEMORY TUBE

Filed March 18, 1953 4 Sheets-Sheet 3

INVENTORS
ADRIANUS JOHANNES WILHELMUS
MARIE VAN OVERBEEK
HENDRIK GROENDIJK
BY [signature]
AGENT

MEMORY TUBE

Filed March 18, 1953 4 Sheets-Sheet 4

INVENTORS
ADRIANUS J. W. M. VAN OVERBEEK
HENDRIK GROENDIJK
BY
Fred M. Vogel
AGENT

United States Patent Office 2,916,662

Patented Dec. 8, 1959

2,916,662

MEMORY TUBE

Adrianus Johannes Wilhelmus Marie van Overbeek and Hendrik Groendijk, Eindhoven, Netherlands, assignors, by mesne assignments, to North American Philips Company, Inc., New York, N.Y., a corporation of Delaware Application March 18, 1953, Serial No. 343,020

Claims priority, application Netherlands April 5, 1952

13 Claims. (Cl. 315—12)

Figure 7:
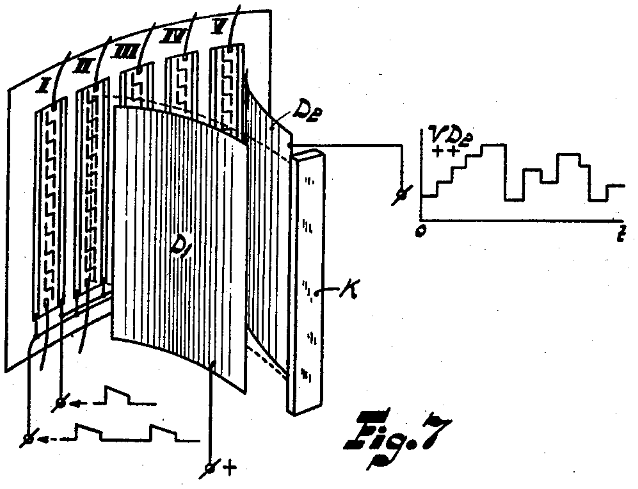

This invention relates to a device for the delayed transmission of indications in the form of positive or negative voltage pulses of particular electrodes of an electron-discharge tube, wherein one or more beams are produced which can be urged into particular positions and maintained therein. Conventional devices of this type mostly comprise secondary-emission electrodes which may be so mounted as to be completely insulated and whose secondary electrons are drawn off by a positive electrode.

The electron discharge tubes used for this purpose were usually complicated and of large size. Moreover, high voltages were generally required and only a comparatively small number of indications could be stored in one tube.

Those limitations can now be avoided and special advantages and applications are obtainable if, in accordance with the invention, in a device for the delayed transmission of voltage pulses, which comprises an electron-discharge tube wherein at least one electron beam is adapted to strike a number of electrodes whose surface has at least in part a secondary-emission coefficient exceeding unity and of which at least a number are mounted in an insulated manner, the secondary electrons being drawn off by a positive or collector electrode, the electrodes are so formed and arranged that the drawing off with at least one secondary-emission electrode is influenced by the potential of a neighbouring insulated electrode in a manner such that the voltage condition of the first-mentioned electrode, after supplying a pulse-shaped current, depends upon the said potential.

In order that the invention may be readily carried into effect it will now be described in detail with reference to the accompanying drawings, given by way of example, in which Figs. 1 to 4 illustrate the principle underlying the invention, Figs. 5 to 11 represent embodiments of the invention, and Figs. 12 to 15 illustrate applications of the invention.

The invention is based on the following principle.

Three electrodes shaped as shown in Fig. 1*a* are mounted in an insulated manner and adapted to be struck by an electron beam, as shown in Fig. 1*b*. The surface of the electrode A has a secondary-emission factor $\delta>1$. In front of the electrode A is provided a grid *g* which is maintained at a positive voltage and which serves as a collector electrode. The parts $A_1$ and $A_2$ of the electrode A are surrounded or embraced by electrodes B and C respectively. The latter electrodes influence A to the effect that the characteristic curve $Ia=f(Va)$ of electrode A resembles the characteristic curve of a pentode tube if the electrodes B and C are maintained at zero potential (as shown in Fig. 2*a*).

If, however, a positive voltage is applied to B and C the electrode A will have a characteristic curve resembling that of a tetrode (Fig. 2*b*) since the secondary electrons are now allowed to travel from A to the positive or collector electrode *g* so long as the voltage of A does not exceed V*g*. The intersection *p* of the curve with the V*a*-axis is then unstable, since the voltage of A will drop to zero due to the electron current to A or will rise to V*g* due to the secondary emission.

If either of the electrodes B or C has cathode potential and the other has the same positive voltage V*g* as that of the grid *g* the curve will correspond to that shown in Fig. 2*c*, the intersection $p_2$ then being unstable.

If the electrode A is exclusively capacitatively connected to the cathode through a direct voltage source $V_D$, whose voltage has a value between $V_{p1}$ and $V_{p2}$, for example equal to ½ V*g* in this instance, for a time $t_1$ to $t_2$ (Fig. 3) the following may happen:

If electrodes *B* and $C=0$, then A can only be zero volt even if a pulse of ½ V*g* (Fig. 3) is supplied capacitatively. This is true because as soon as A is driven positive, the electrons of the beam directed to A will neutralize the positive charge and, since the electric field produced by electrodes B and C prevents secondary emission from A, A will become zero (Fig. 2*a*). In the case of Figs. 2*b* and 2*c* there is a possibility that A will acquire the voltage of grid *g* owing to the secondary emission which may occur after a positive voltage pulse.

If the positive voltage pulse is capacitatively supplied to A for the time indicated in Fig. 3, the following may happen in the case shown in Fig. 2*b*, dependent upon the voltage condition of A at the instant $t_0$.

*Case a.*—At the instant $t=t_0$, $V_A=0$. At $t=t_1$ an impulse+½ V*g* is connected capacitatively to electrode A. As indicated in the curve shown in Fig. 2*b*, increasing the voltage of electrode A from zero to a value of ½ V*g* causes the electrcde A to be driven still more positive to approximately +V*g* due to the negative secondary emission current I*a*. If, after a time T (Fig. 3) the voltage of ½ V*g* is reduced to zero, A receives a negative impulse of ½ V*g* so that the voltage of electrode A momentarily drops from V*g* to ½ V*g*, but owing to the secondary emission, A becomes again charged to V*g*.

*Case b.*—$V_A=Vg$ at $t=t_0$. With the positive pulse, when $t=t_1$, $V_A$ consequently becomes 3/2 V*g*. During T, A again receives elcctrons from the beam, since now the primary current exceeds the secondary current, as may be seen from Fig. 2*b*. The negative charge carried to electrode A by the electrons in the primary current builds up, reducing the potential of electrode A till $V_A$ has again become approximately V*g*. When $t=t_2$ the same occurs as in the case *a* i.e., the negative-going trailing edge of the pulse causes the voltage level of electrode A to drop momentarily to the unstable level of ½ V*g* from which it quickly recovers approximately to V*g*.

*Result.*—If the electrodes B and C are both positive, A, after an impulse, as shown in Fig. 3, will everytime come to rest at a voltage V*g*, independently of the preceding charging condition.

In the case shown in Fig. 2*c* it can accordingly be shown that $V_A$ everytime becomes zero after such an impulse.

The final voltage of A is consequently determined by the voltage condition of B and C. After the pulse, however, the voltage condition of B and C no longer influences the voltage condition of A and, hence $V_B$ and $V_C$ can be varied without affecting $V_A$, provided both of them do not become zero. Only if a pulse is applied to electrode A, does the voltage $V_A$ vary, dependent upon the voltage condition of electrodes B and C at this instant. Electrode A may now be so shaped as to permit an adjacent electrode to be also controlled by the voltage condition of electrode A.

Figure 14:
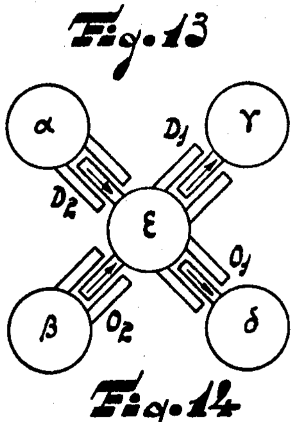
Figure 15:
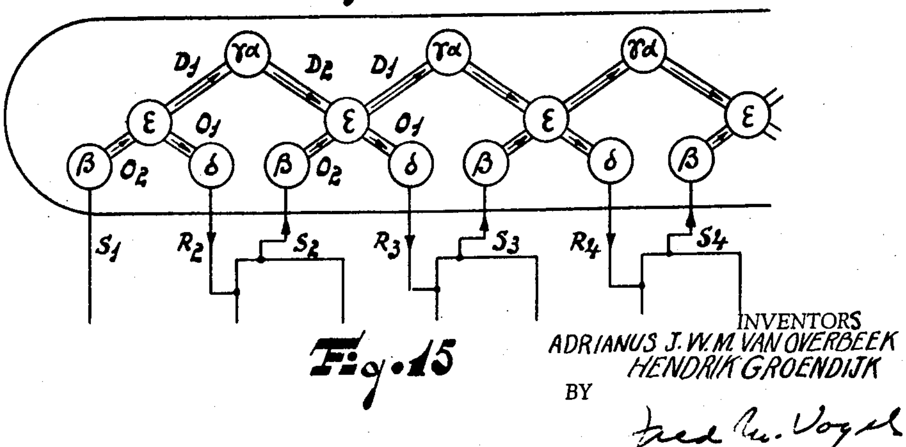

It is feasible to form a row of electrodes in a manner such that the first controls the second, the second controls the third, and so on. Each electrode may further be so formed as to permit a plurality of other electrodes to be controlled, which, for example, are connected different circuits (Figs. 14 and 15).

The invention is based on the fact that the $Ia$—$Va$ curve shown in Figs. 2*b* and 2*c* has three intersections with the line $Ia=0$ and utilises the fact that the position of the intermediate intersection is movable relatively to both other intersections by the action of the potential of one or more other electrodes. Thus, for example, the electrodes may be shaped and spaced relative to each other in a manner such that the curve shown in Fig. 2*b* is obtained only if both or all of them are positive, or the curve shown in Fig. 2*c* is obtained (coincidence control) only if both or all of them are zero.

In this manner an electron discharge tube can be constructed which may act as a register or memory and is adapted to perform some further functions which occur in digital computing mechanisms.

When adopting the aforesaid principle one is not bound to the method of control referred to. As a rule, however, the control will require two phases, since the electrode A may have a high potential (condition 1) or a low potential (condition 0) and must consequently allow of being brought from condition 1 into condition 0 and conversely from condition 0 into condition 1. The condition of electrode A after having a pulse, such as shown in Fig. 3, applied to it depends upon the condition of the controlling electrodes. Hence, one of the two opposite voltage excursions, i.e., the leading and trailing edges, is each time inoperative.

Instead of using a rectangular control pulse (as shown in Fig. 3) a control pulse as shown in Fig. 4 may be used for capacitative control. The latter pulse has a steep front $+Vg$ so that a pulse of a value $Vg$ is supplied to A and A is always brought into the condition 1 independently of the preceding condition. The steep front, or leading edge of the pulse may consequently be considered to have an erasing effect. The control pulse may now slowly drop to a value which in this instance need not be equal to ½ $Vg$ but is chosen in accordance with the location of the intermediate intersection of the $Ia$—$Va$ curve and the abscissa. Fig. 4 shows such an impulse. The relatively slow drop in value of the applied pulse from $Vg$ to 0.4 $Vg$ has no effect in the current to (or from) electrode A, but the sharply negative-going voltage excursion supplied to A at the termination of the control impulse shown in Fig. 4 is required to be of such magnitude that A, in accordance with the condition of the controlling electrodes, either remains in the condition 1 or shifts to the condition 0. If the amplitude of the trailing edge of the control pulse is small, the voltage of A remains higher than that of the intermediate intersection of the curve. Conversely, if the control pulse does not decrease much from its initial value, then its amplitude will be high at the time of occurrence of its trailing edge, and as a consequence, the high negative-going impulse imparted to electrode A by the trailing edge will cause that electrode to go negative with respect to the intermediate intersection of the curve in Fig. 2*c*, and electrode A will thereupon shift to condition 0. If A is simultaneously controlled by two or more other electrodes B and C and so on, the value of the control pulse at its termination as shown in Fig. 4 may be chosen to be such that the final condition of A depends upon whether all the control electrodes are simultaneously in condition 1 or only one or a few of them are in this condition. As a matter of fact the location of the middle intersection of the curve in Fig. 2*c* with the abscissa depends upon the number of controlling electrodes in condition 1. Of course, it is also possible to use control pulses which are mirror images with respect to the zero line of the impulses shown in Figs. 3 and 4, i.e., are negative pulses.

The control, instead of being effected by means of capacitative pulses, may alternatively be effected by causing the controlled electrode to be temporarily struck by electrons from a cathode having a higher and a lower voltage respectively than the voltage in the rest condition.

Finally, the controlled electrode may alternatively be bombarded by a stream of electrons only at the instant of supplying the pulse.

The indications which are stored on the electrodes and are transmitted in a delayed manner may consist of two different types of series, namely series comprising arbitrary indications, for example 1101011001 and series consisting of two succeeding parts, for example 0000001111. The last mentioned series may, for example, be of the type which represents the number 4 or 6 in a decimal system.

Referring now to Fig. 5, in transmitting such a series of radices the provision may be made that all the electrodes are in the same condition, for example in the condition 1 at the beginning of taking up the indications. Subsequently, a control pulse is simultaneously supplied to all the electrodes of a row $E_1$, $E_2$, $E_3$ . . . $E_{11}$, of such a nature that $E_2$ assumes the position of $E_1$, $E_3$ that of $E_2$, $E_4$ that of $E_3$ and so on. At the same time the indication 1 is supplied to $E_1$. This operation is effected four times and then the indication 0 is supplied to $E_1$, $E_2$ being made equal to 0 by means of a common control impulse imparted to all electrodes. This is repeated six times. It will be evident that in this manner, after supplying ten control impulses, the binary series 1111000000 has been taken up by the electrodes $E_2$ to $E_{11}$.

From this it will be seen that for advancing the indications it may sometimes be sufficient to supply a current impulse simultaneously to all the electrodes E, which may yield considerable constructional advantages in manufacturing a tube according to the said principle.

However, said operation cannot directly be used for an arbitrary series, such as 1101011001, since for the last-mentioned control use is made of the fact that in the starting condition all the electrodes are in the same condition, so that in this instance passing over from this condition to the other condition is only necessary which does not require an erasing impulse.

An arbitrary series requires, however, both changing over from the condition 1 to 0 and from 0 to 1. To this end it is necessary first to give an erasing impulse to the effect of splitting up the said transitions. If the erasing impulse urges all the electrodes into the condition 1, both transitions take place as follows.

| transition: | | erasing impulse | | control impulse |
|---|---|---|---|---|
| 1→0 | becomes | 1→1 | and | 1→0 |
| 0→1 | becomes | 0→1 | and | 1→1 |

If the erasing impulse urges all the electrodes into the condition 0, we have:

| | | | | |
|---|---|---|---|---|
| 1→0 | becomes | 1→0 | and | 0→0 |
| 0→1 | becomes | 0→0 | and | 0→1 |

When using an arbitrary series of impulses, the control of a row of electrodes $E_1$—$E_2$—$E_3$—$E_4$ and so on, of which $E_2$ is controlled by $E_1$; $E_3$ by $E_2$; $E_4$ by $E_3$; $E_5$ by $E_4$ and so on (Fig. 5) may be effected in succession and alternately. In the first-mentioned case the last electrode $E_{n-1}$ is first controlled by the penultimate $E_{n-2}$ and so on. When using electron bombardment for this control, this can be effected by means of an electron beam scanning the electrodes in succession. A separate electron stream, striking all the electrodes simultaneously, may then hold them in the condition 1 or 0. If desired, a plurality of sweeping electron beams may be used, one of which "erases" and the other provides for the control proper.

For alternative control the even-indexed electrodes are simultaneously controlled by the odd-indexed electrodes, the odd-indexed electrodes being subsequently controlled by the even-indexed electrodes. This control may advantageously be effected capacitatively, since in this case the electrodes need not be transmitted to the outside each individually as is desirable in the case of capacitative control according to the successive method.

Fig. 5 shows a fundamental embodiment. The electrodes $E_1$, $E_2$ and so on are so mounted on an insulating support as to be completely insulated, said support carrying at its other side impulse-electrodes in the form of corresponding metal plates to which, consequently, the companion insulated electrodes E are coupled capacitatively. A particularly simple construction permitting a large number of electrodes E to be incorporated in a comparatively small tube is obtained by providing the electrodes, by vaporisation, in the form of a metal layer on the insulating support by means of a templet. The subjacent layer may, for example, consist of mica. Alternatively it may be an oxide layer applied to a metal surface. The electrodes are covered with a layer having a high secondary-emission coefficient. It may be advisable that electrode parts, adjoining neighbouring electrodes so that they may be struck by stray electrons, should be provided with a layer having a secondary-emission coefficient $\delta=1$ in condition 1.

The electrode E may alternatively be produced by providing, by vaporisation, a coherent layer on an insulating support, the layer between the different electrodes being subsequently removed by pickling or scratching to the effect of insulating the electrodes from each other. Alternatively, they may be produced by means of photographic methods. The said characteristic curves may further be obtained by partly coating the surface with a high secondary emission layer, and partly with a low secondary emission layer.

In Figs. 5 and 5*a*, the latter of which is a cross-sectional view along the dash-dot line, two metal plates 1 and 2 are each provided with an insulating layer 13 and 14, respectively, plate 1 supporting E-shaped electrodes $E_1$, $E_3$, $E_5$, and so on, and plate 2 supporting E-shaped electrodes $E_2$, $E_4$, $E_6$ and so on, provided, for example, by vaporization, the latter electrodes being interfitted with the former. The plates 1 and 2 constitute the impulse electrodes. Alternatively, by making provision that only to those teeth identified by the letter A of the interfitted teeth of the electrodes $E_1$, $E_2$ and so on which are struck by electrons, the electrode $E_2$ is controlled by $E_1$; in the same way as electrode A in Fig. 1 is controlled by electrodes B and C if a voltage impulse as shown in Fig. 3 or 4 is imparted to the impulse electrode 2. Also, electrode $E_4$ is controlled by electrode $E_3$, and so on. If an impulse is imparted to the impulse electrode 1, $E_3$ is controlled by $E_2$, $E_5$ by $E_4$ and so on. Because of this chain of control, $E_1$ can be urged into either the condition 0 or 1 by a new indication. By alternately imparting impulses to the impulse electrodes 2 and 1 an indication is consequently transmitted from $E_1$ to $E_2$, from $E_3$ to $E_4$ and so on. If, however, the electron beams are directed to the parts B an indication travels alternately in the opposite direction to $E_1$.

An indication transposed into the binary system, for example 1101, may now be introduced into the tube and stored therein by urging $E_1$ from without successively into the conditions 1, 0, 1, 1, an impulse being alternately supplied to plate 2 and plate 1 between every two indications.

The voltage conditions of the electrodes as a function of the time may then as as follows:

| | $E_1$ | $E_2$ | $E_3$ | $E_4$ | $E_5$ | $E_6$ | $E_7$ |
|---|---|---|---|---|---|---|---|
| initially | 0 | 0 | 0 | 0 | 0 | 0 | 0 |
| first indication | 1 | 0 | 0 | 0 | 0 | 0 | 0 |
| even-numbered impulse | 1 | 1 | 0 | 0 | 0 | 0 | 0 |
| odd-numbered impulse | 1 | 1 | 1 | 0 | 0 | 0 | 0 |
| second indication | 0 | 1 | 1 | 0 | 0 | 0 | 0 |
| even-numbered impulse | 0 | 0 | 1 | 1 | 0 | 0 | 0 |
| odd-numbered impulse | 0 | 0 | 0 | 1 | 1 | 0 | 0 |
| third indication | 1 | 0 | 0 | 1 | 1 | 0 | 0 |
| even-numbered impulse | 1 | 1 | 0 | 0 | 1 | 1 | 0 |
| odd-numbered impulse | 1 | 1 | 1 | 0 | 0 | 1 | 1 |
| fourth indication | 1 | 1 | 1 | 0 | 0 | 1 | 1 |

Now the odd-numbered electrodes $E_1$—$E_3$—$E_5$—$E_7$ can be read.

If this indication is required, it may be caused to leave the tube to the right by imparting alternately impulses to the impulse electrodes 2 and 1 to the effect that volage pulses 1, 0, 1, 1 will leave the tube in succession by way of the last electrode $E_n$ in the chain.

By directing the electron beams to the parts B the indication may thus be brought again to the inlet $E_1$. In this instance the electron beams must be capable of being deflected or controlled in order to permit directing them alternately to the parts A or to the parts B.

In order to avoid undue mutual disturbance due to stray electrons, the electrodes E should not be so positioned as to be entirely flat, thus causing the electrode plates 1 and 2 to assist in controlling the electrodes E.

A further embodiment is shown in Figs. 6 and 6*a*, of which the latter is a cross-sectional view along the dash-dot line. The S-shaped secondary-emission electrodes $E_1$, $E_2$ and so on, which are completely insulated and of a very simple shape, are applied, by vaporisation, to a strip of mica 16. At both sides of the row of electrodes E are provided strip-shaped electrodes $C_1$ and $C_2$ the function of which corresponds to that of the electrode C in Fig. 1. The characteristic curves of the electrodes E are influenced by changing the voltage of the electrodes C and correct adjustment permits of securing a reliable control effect. On the back of the mica strip may be provided two impulse electrodes 15, 15' in the form of strips of conductive material, behind the even numbered and the odd-numbered electrodes E respectively. These strips are used in capacitative impulse control. By directing the electron beams alternately to the right-hand or to the left-hand teeth of the electrodes E (position I and II respectively) $E_1$ is controlled by $E_2$; $E_2$ by $E_3$ respectively and so on, or conversely.

If, in a row as shown in Fig. 6, $E_1$ is connected to an input voltage, the last electrode $E_n$ is also transmitted to the outside and its voltage is considered as the output voltage, the memory tube thus obtained having the advantage that the series of indications introduced therein may be recovered at any desired instant. Such single tubes suffer from a limitation in that only every other electrode comprises a new indication. However, it is possible to connect two rows of electrodes in parallel, one row receiving the first, third indication and so on of a series of indications and the other row of electrodes receiving the even-numbered indication of the series of indications. If the time between two indications of a series to be stored is shorter than the time required for advancing the indications in the memory tube, more than two of said rows of electrodes may be connected in parallel. When using four rows, for example, the first indication may then be picked up by the first row, the second indication by the second row and so on till the fifth indication is again picked up by the first row. Fig. 7 shows a particularly advantageous arrangement of this type. A ribbon-shaped beam from the cathode K strikes one of the rows I to V by the action of the voltage of the deflection plates $D_1$ and $D_2$. Only the indications of the row struck by the electron beam advance to the effect of obtaining indications only from this row. On supplying impulse voltages to the impulse electrodes of the rows I to V, the beam may be caused to sweep over the rows, so that each row is struck by the current at the correct instant and its indications advance.

This arrangement has a further advantage. It is possible to store a separate series of indications in each of the rows of electrodes I to V. When required, the beam may be directed to the desired series of electrodes and the series of indication obtained therefrom by means of impulses. The same impulses may be supplied to the other rows of electrodes, but since they are not struck by the beam they will retain their indications. In the rest condition the beam may be caused to sweep to and fro so as to maintain that the low current required for causing the electrodes to hold their indications, remains available.

Fundamentally, such a tube with a large number of rows of electrodes, each having a large number of indications, requires only a small number of outlets, namely besides those for the gun and the deflection plates, one leading-in and one leading-out conductor for all the rows jointly and, moreover, two for supplying the impulse voltages. In spite of this small number of input and output connections, each series of indications is directly accessible due to an abrupt voltage variation of the deflection plates.

If the rows I to V each comprise ten electrodes E, a tube construction as shown in Fig. 7 may be conveniently used as a memory tube in computing mechanisms of radix ten. Each, for example, vertical row then corresponds with one figure of a number. In this instance, a decimal can be recorded in each vertical row, and 8 to 10 rows, corresponding with 8 to 10 decimals, can be incorporated in a tube of the size of an ordinary radio-receiving tube. The indications can be recovered from the tube in a very short time.

Figure 8:
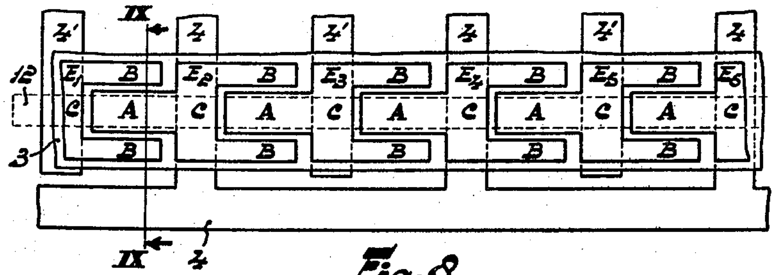

Fig. 8 shows a still different embodiment of the invention in which the fork-shaped electrodes E are provided, by vaporisation on a strip of mica 3. The parts A of each electrode have a pentode-curve if the adjacent parts B of the preceding electrode are in the condition 0, but a tetrode-curve (Fig. 2*b*) if the parts B are in the condition 1. Since the parts C consistently have a tetrode-curve, a curve as shown in Fig. 2*c* is obtained if the parts B of the preceding electrode have zero potential. When directing an electron beam to the parts A and the adjacent parts C, and impulses as shown in Figs. 3 or 4 are supplied to the subjacent strip-shaped impulse electrodes 4, an indication will move from $E_1$ to $E_2$, from $E_3$ to $E_4$ and so on. When supplying, however, impulses to the impulse electrodes 4', the indication proceeds from $E_2$ to $E_3$, from $E_4$ to $E_5$ and so on. This construction has the great advantage that the beam need not be deflected.

Figure 9:
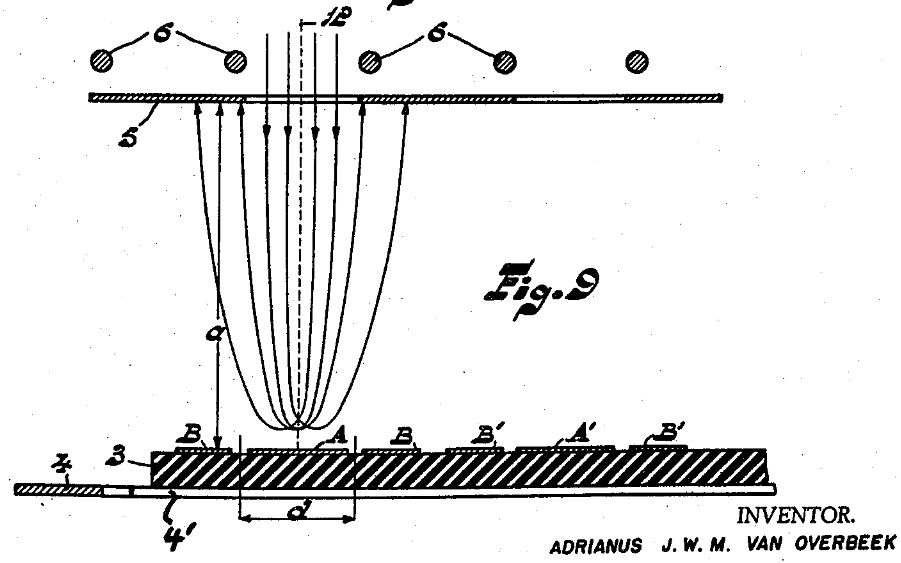

In order to avoid deviation of the electrons from the beam to the parts B if a part A in condition 0 is situated between two parts B in the condition 1, use is made of electron-optical means as shown in Fig. 9, wherein a section IX—IX of Fig. 8 is shown on a larger scale. Fig. 9 further shows the collector electrode 5 for the secondary electrons, which consequently corresponds to *g* shown in Fig. 1 and consists of a slotted plate 5. It has been found that the ratio between the spacing *a* of the accelerating electrode 5 from the secondary-emission electrodes E and the width *d* of the parts A should be $$\frac{a}{d}=\frac{\pi}{4}\cdot\frac{Va}{Vk}$$

wherein V*a* represents the anode voltage, which is equal to the voltage V*g* of the collector electrode 5, and V*k* represents the voltage at which occurs the bend of the I*a*—V*a* curve of the electrode E. When making $Va=$ 250 and $$Vk\overset{\alpha}{=}70$$

volts, the ratio *a*/*d* is found to be approximately 3 in practice.

Figure 10:
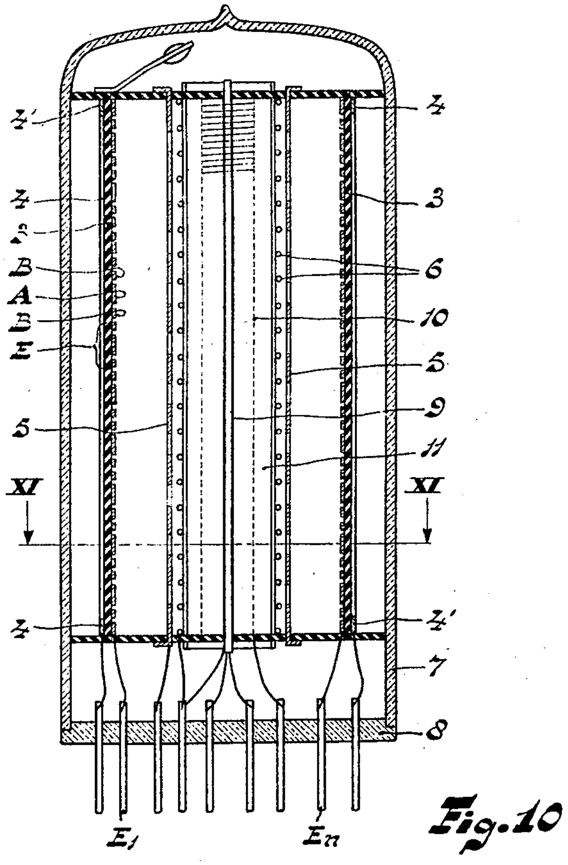
Figure 11:
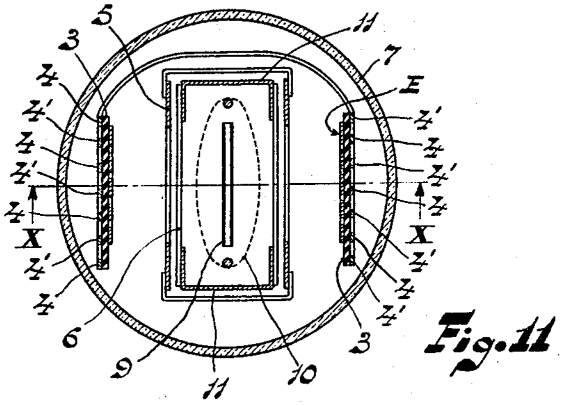
Figure 12:
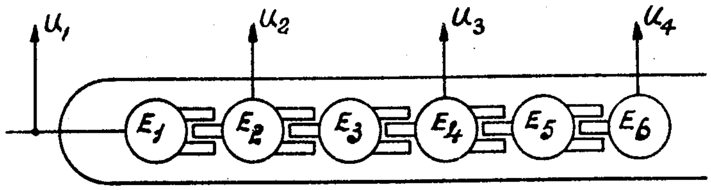

In the structure of Fig. 9, deviation of the primary electrons to the parts B is avoided by providing rods 6, which are maintained at a low potential or zero potential, closely in front of the slots of the screen or collector electrode 5 to focus the electrons 12 onto the centre of the parts A (Fig. 8). If the parts A are in the condition 0, the electrons are reflected to the collector electrode 5 according to the paths shown in the drawing. The rods 6 may constitute a grid as shown in Fig. 10, wherein 7 denotes the bulb of a tube which is closed by a bottom 8 into which contact pins are sealed. The tube comprises a cathode 9 preferably of rectangular cross-section and having the broad sides coated with electron-emitting material. The cathode 9 is surrounded by a positive space charge grid 10 by which the space charge about the cathode is reduced and a considerable stream of electrons is obtained. The grid 10 is surrounded by the electrode 6 consisting, for example, of two flat grids with parallel wires which are wound on plate-shaped screens 11. The wires of grid 6 are arranged relatively to the slotted electrode 5 as shown in Fig. 9. At the aforesaid distance *a* from the electrode 5 is provided an insulating plate 3 carrying, at its side facing the cathode the secondary-emission electrodes E, for example in ten rows each comprising 5 electrodes E in a manner such that each row is situated just behind a slot of the electrode 5. The mica plate 3 is externally covered with strips of the impulse electrodes 4 and 4' to which the impulse voltages are supplied. The rows of secondary-emission electrodes may be directly interconnected, thus permitting twenty-five indications to be recorded successively on each mica plate 3 carrying fifty electrodes E, hence fifty indications are recorded in the tube as respresented. If the impulse electrodes 4 and 4' of each half of the system are separately transmitted to the outside, the two groups each comprising fifty electrodes can be controlled independently, thus doubling the rate, since both groups are adapted to operate in parallel, as it were. To this end, the indications may be alternately supplied to one group and the other. This may alternatively be achieved by connecting the strips 4 of one group to the strips 4' of the other group and conversely.

The diameter of bulb 7 of the tube need not exceed the usual diameter of approximately 30 mm. for radio-receiving tubes, the required number of connecting pins not exceeding ten, whereas twelve are required in the last-mentioned case. If the electrode 6 in the tube is directly connected to the cathode, and also the strips 4, 4' of both electrode groups, nine supply pins are sufficient, as shown in Fig. 10. The embodiment shown in Figs. 8 to 11 has the great advantage that the construction of the tube does not materially depart from the usual constructions and deflection of the beams is not necessary. Voltages of approximately 100 and approximately 250 volts may, for example, be applied to the space charge grid 10 and to the electrode 5 respectively. The electrode 6 may be connected to the cathode.

The rows of each group may be so arranged as to be connected in series so that the indications pass over from the end of one row to another row. The rows may be so arranged that the fork-shaped parts point alternately to one side and to the opposite side. In this instance the strips 4 and 4' are required to be so arranged as to permit passing over from one row to the other.

Besides the aforesaid constructions a great variety of other constructions may be used for carrying the invention into effect, wherein a particular electrode is adapted to be controlled by a plurality of other electrodes or is in itself able to control a plurality of other electrodes.

One example of a multiplication circuit-arrangement according to the binary system, wherein for the registers use is made of tubes embodying the aforesaid principles, is given below:

A number A (which is to be multiplied by a number B) is supplied to a register. This register transmits its contents continuously in parallel to a number of addition tubes or circuit-arrangements capable of adding three binary digits to form a number consisting of two result indications. One of these two result indications, the carry (radix 2) is continuously transmitted as an input indication to the addition circuit of the next following order. The third input indication is obtained from the result register, wherein the result of the multiplication operation is built up. The result register comprises three parts: one part, the accumulation or storage register, stores the result of the multiplication inasmuch as it has proceeded at a given instant and is adapted to transmit it to the outlet; a second part, connected in parallel with the first, supplies this result to the addition circuits, the third part transmitting the newly obtained result to the first-mentioned part, the storage register. If, consequently, the result passes from the storage register by way of the addition circuits back to the storage register, the number A has once been added to it. The circuit-arrangement is such that, moreover, the result has moved up one binary position in the storage register, so that for a next addition the number A, moved up one step, is added to the result. The result register is arranged in a manner such that the result is moved or shifted one place if the number B comprises a 0, but the result passes by way of the addition circuits back to the storage register if the number B comprises a 1. Hence, the number B is supplied in a form such that for each of its digits it is determined whether the result will be directly shifted one place or by way of the addition circuit-arrangement.

Figs. 12 to 15 show an example of such a multiplication circuit-arrangement, wherein for the registers use is made of register tubes operating on the aforesaid lines.

Figure 13:
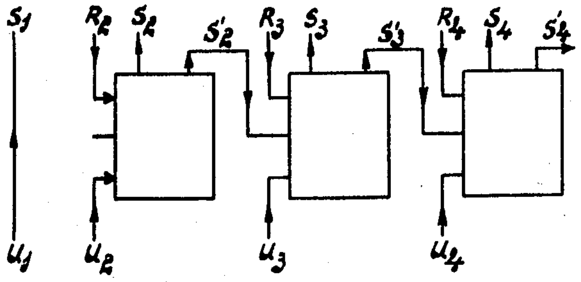

Fig. 13 shows the input register of the multiplication circuit. It comprises a series of electrodes controlling one another in accordance with the alternative method. Thus, there is a new digit for every other electrode. After the series of digit signals of the number A has entered the tube by way of the electrode $E_1$, the voltages of the outlets $U_1$, $U_2$, $U_3$, $U_4$ . . . give the parallel-connected output indications which may be supplied to the addition circuits. The addition circuits themselves are diagrammatically represented in Fig. 13.

One digit, the digit $U_1$, is from the number A. The digit R originates from the number B and the indication S' is the carry stored of the preceding addition circuit preceding in order.

The outlets are: S for the units and S' for the binary digits. The last-mentioned output voltage is transmitted to the addition circuit of next order ($U_1$ does not require an addition circuit).

For the result register one principle of those referred to before is adopted. It has been stated that it is possible to control one and the same electrode $\epsilon$ at will either by the electrode $\alpha$ or the electrode $\beta$. This controlled electrode is in turn able to control at will either the electrode $\gamma$ or the electrode $\delta$. This is diagrammatically shown in Fig. 14.

An operation $D_2$ is effective to control $\epsilon$, which is consequently conformed to $\alpha$, an operation $O_2$ being effective to control the electorde $\epsilon$ by $\beta$. $D_1$ is an operation effective to control $\delta$ by $\epsilon$, and $O_1$ is an operation effective to control $\delta$ by $\epsilon$. The result register looks as shown diagrammatically in Fig. 15. It comprises a number of electrodes $\epsilon$ which are internally connected by electrodes which, for the preceding $\epsilon$, act as the electrode $\gamma$ just referred to, and for the following $\epsilon$ act as $\alpha$. The electrodes $\beta$ and $\delta$ are connected to the addition circuit.

Multiplication is effected as follows: the number A is supplied to the inlet register. Subsequently the number B is supplied to the circuit-arrangement. The result register is operated in a manner such that for a 1 of this number B first the operation $O_1$ is effected. Subsequently the addition circuits perform their function and finally the operation $O_2$ is effected. The partial result is stored by the electrodes $\epsilon$. For a figure 0 of the number B first the operation $D_1$, then $D_2$ is effected. Hence, the partial result moves up one step.

The result is taken from the outlet of the result register. Alternatively, the result may be taken in parallel from the result register, for example from the electrodes $\delta$.

There are still further possibilities, since the principle referred to in the preamble i.e. control of a stable setting of the potential of one electrode by the setting of the potential of a further electrode, may be adopted for various other purposes.

Thus, for example, an impulse may be caused to travel at an adjustable rate along a row of electrodes and this impulse may be branched at given points.

Alternatively, the electrodes adapted to assume two conditions may be caused to control an entirely different electron beam, for example by deflection. The last-mentioned beam may, for example, be used for optical or electrical indication of the voltage condition of the electrodes. Optical indication is alternatively possible by coating the electrodes with luminescent material.

Besides the applications referred to a variety of other applications of a device and a tube according to the invention fall under the scope thereof.

What we claim is:

1. An electron discharge memory device comprising means for producing at least one electron beam along a given path, a plurality of substantially coplanar secondary-emission electrodes disposed in the path of said beam and substantially perpendicular thereto, said electrodes each having a surface facing said beam-producing means, at least a portion of said surface being constituted of a material exhibiting a secondary-emission coefficient exceeding unity, and an electron permeable collector electrode disposed in said path between said means for producing said electron beam and said secondary emission electrodes to receive the secondary electrons emanating from said secondary-emission electrodes, said secondary-emission electrodes being completely insulated from and in charge-retaining relationship relative to one another, each of said secondary-emission electrodes having portions partially embracing portions of the succeeding electrode, whereby the voltage condition of each of said electrodes is determined by the voltage condition of an adjacent electrode.

2. A device as claimed in claim 1 wherein the secondary-emission electrodes are each E-shaped and are arranged in symmetrical rows in interfitting relationship.

3. A device as claimed in claim 1 wherein the secondary-emission electrodes are each S-shaped and are arranged in a symmetrical fashion in interfitting relationship.

4. A device as claimed in claim 1 wherein the secondary-emission electrodes are fork-shaped and are arranged in symmetrical rows in interfitting relationship.

5. An electron discharge memory device comprising means for producing at least one electron beam along a given path, an insulating support disposed in the path of said beam, a row of successively-arranged secondary-emission electrodes mounted on the side of said support facing said beam-producing means, said electrodes each having a surface facing said beam-producing means of which at least a portion is constituted of a material exhibiting a secondary-emission coefficient exceeding unity, a collector electrode disposed between said beam-producing means and said secondary-emission electrodes to receive the secondary electrons emanating from said secondary-emission electrodes, said secondary-emission electrodes being completely insulated from and in charge-retaining relationship relative to one another, each of said secondary-emission electrodes having portions partially embracing portions of the succeeding electrode, whereby the voltage condition of each of said electrodes is determined by the voltage condition of an adjacent electrode, and an impulse electrode mounted on the side of said insulating support remote from said beam-producing means capacitatively associated with each of said emission electrodes, alternate ones of said emission electrodes being interconnected together.

6. A device as claimed in claim 5 wherein terminal means are provided for the first and last emission electrodes of the row, and terminal means are provided for each of the impulse electrodes.

7. A device as claimed in claim 6 wherein a plurality of rows each containing successively-arranged emission electrodes are provided, and the beam-producing means produce a ribbon-shaped beam of electrons.

8. An electron discharge memory device comprising means for producing a ribbon-shaped electron beam along a given path, an insulating support disposed in the path of said beam substantially perpendicular thereto, a plurality of S-shaped secondary-emission electrodes mounted on the side of said support facing said beam, said electrodes each having a surface facing said beam-producing means, at least a portion of each said surface is constituted of a material exhibiting a secondary-emission coefficient exceeding unity, an electron-permeable collector electrode disposed in said path between said means for producing said beam and said secondary emission electrodes to receive the secondary electrons emanating from said secondary-emission electrodes, said secondary-emission electrodes being completely insulated from and in charge-retaining relationship relative to one another, each of said secondary-emission electrodes having portions partially embracing portions of the succeeding electrode such that corresponding portions of the S-shaped electrodes are aligned with each other to define two rows of aligned portions, whereby the voltage condition of each of said electrodes is determined by the voltage condition of an adjacent electrode, an impulse electrode mounted on the other side of the insulating support behind each S-shaped electrode, said impulse electrodes being capacitatively coupled to their associated S-shaped electrode, means for deflecting the electron beam alternately to the two rows of aligned portions, and means for applying control pulses to the impulse electrodes.

9. An electron discharge memory device comprising means for producing an electron beam along a given path, an insulating support disposed in the path of said beam substantially perpendicular thereto, a plurality of alternately-facing substantially coplanar E-shaped secondary-emission electrodes mounted on the side of said support facing said beam, said electrodes each having a surface facing said beam-producing means of which at least a portion is constituted of a material exhibiting a secondary-emission coefficient exceeding unity, an electron permeable collector electrode disposed in said path substantially parallel to said secondary emission electrode and between said secondary emission electrode and said means for producing an electron beam to receive the secondary electrons emanating from said secondary-emission electrodes, said secondary-emission electrodes being completely insulated from and in charge-retaining relationship relative to one another, each of said secondary-emission electrodes having portions partially embracing portions of the succeeding electrodes such that the projections of one E-shaped electrode are disposed between the projections of the two adjacent E-shaped electrodes, whereby the voltage condition of each of said electrodes is determined by the voltage condition of an adjacent electrode, a pair of plate-shaped impulse electrodes mounted on the other side of said support each capacitatively coupled to a series of alternative E-shaped electrodes, and means for applying control pulses to said impulse electrodes.

10. An electron discharge memory device comprising means for producing an electron beam along a given path, an insulating support mounted in the path of said beam, a plurality of rows of successively-arranged fork-shaped secondary-emission electrodes mounted on the side of said support facing said beam, said electrodes each having a surface facing said beam-producing means of which at least a portion is constituted of a material exhibiting a secondary-emission coefficient exceeding unity, a collector electrode disposed to receive the secondary electrons emanating from said secondary-emission electrodes, said secondary-emission electrodes being completely insulated from and in charge-retaining relationship relative to one another, each of said secondary-emission electrodes having portions partially embracing portions of the succeeding electrode such that the central portion of each forked-shaped electrode is disposed between the bifurcated portion of an adjacent electrode whereby the voltage condition of each of said electrodes is determined by the voltage condition of an adjacent electrode, a pair of impulse electrodes mounted on the other side of the support and associated with each of said rows, one of said impulse electrodes being capacitatively coupled to the even-numbered emission electrodes of the row, the other of said impulse electrodes being capacitatively coupled to the odd-numbered electrodes of the row, and means for supplying control pulses to the impulse electrodes.

11. An electron discharge memory device comprising means for producing a tape-shaped electron beam along a given path, an insulating support mounted in the path of said beam, a plurality of rows of successively-arranged fork-shaped secondary-emission electrodes mounted on the side of said support facing said beam, said electrodes each having a surface facing said beam-producing means of which at least a portion is constituted of a material exhibiting a secondary-emission coefficient exceeding unity, a slotted accelerating electrode disposed between said emission electrodes and said beam-producing means the slots of which are aligned with each row of emission electrodes, focussing rods extending parallel to said rows and on opposite sides of and in front of said slots to focus the beam on the fork-shaped electrodes, said secondary-emission electrodes being completely insulated from and in charge-retaining relationship relative to one another, each of said secondary-emission electrodes having portions partially embracing portions of the succeeding electrode such that the central portion of each fork-shaped electrode is disposed between the bifurcated portion of an adjacent electrode whereby the voltage condition of each of said electrodes is determined by the voltage condition of an adjacent electrode, a pair of impulse electrodes mounted on the other side of the support and associated with each of said rows, one of said impulse electrodes being capacitatively coupled to the even-numbered emission electrodes of the row, the other of said impulse electrodes being capacitatively coupled to the odd-numbered electrodes of the row, and means for supplying control pulses to the impulse electrodes.

12. A device as claimed in claim 11 wherein the beam-producing means includes an elongated cathode and a positive space-charge grid surrounding the cathode.

13. A device as claimed in claim 12 wherein the slotted accelerating electrode is spaced from the fork-shaped electrodes a distance approximately three times larger than the width of the central portion of each of the fork-shaped electrodes.

References Cited in the file of this patent

UNITED STATES PATENTS

| | | |
|---|---|---|
| 2,265,746 | Sandhagen | Dec. 9, 1941 |
| 2,417,450 | Sears | Mar. 18, 1947 |
| 2,617,072 | Van Gelder | Nov. 4, 1952 |
| 2,618,762 | Snyder | Nov. 18, 1952 |
| 2,645,734 | Rajchman | July 14, 1953 |
| 2,747,130 | Goldberg et al. | May 22, 1956 |